(12) United States Patent
Peng

(10) Patent No.: US 10,411,971 B2
(45) Date of Patent: Sep. 10, 2019

(54) METHOD FOR UNIFIED COMMUNICATION OF SERVER, BASEBOARD MANAGEMENT CONTROLLER, AND SERVER

(71) Applicant: Huawei Technologies Co., Ltd., Shenzhen (CN)

(72) Inventor: Lin Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 15/450,213

(22) Filed: Mar. 6, 2017

(65) Prior Publication Data
US 2017/0180216 A1 Jun. 22, 2017

Related U.S. Application Data

(63) Continuation of application No. PCT/CN2015/081072, filed on Jun. 9, 2015.

(30) Foreign Application Priority Data

Sep. 10, 2014 (CN) .......................... 2014 1 0457803

(51) Int. Cl.
*H04L 12/24* (2006.01)
*H04L 12/721* (2013.01)

(52) U.S. Cl.
CPC .......... *H04L 41/24* (2013.01); *H04L 41/0823* (2013.01); *H04L 41/0886* (2013.01); *H04L 45/66* (2013.01)

(58) Field of Classification Search
CPC ... H04L 41/0213; H04L 45/586; H04L 49/15; H04L 67/10; G06F 3/14
See application file for complete search history.

(56) References Cited

U.S. PATENT DOCUMENTS

| 2007/0124474 A1* | 5/2007 | Margulis .................. G06F 3/14 709/226 |
| 2008/0046546 A1 | 2/2008 | Parmar et al. |

(Continued)

FOREIGN PATENT DOCUMENTS

| CN | 1508689 A | 6/2004 |
| CN | 101227329 A | 7/2008 |

(Continued)

OTHER PUBLICATIONS

Machine Translation and Abstract of Chinese Publication No. CN1508689, Jun. 30, 2004, 8 pages.

(Continued)

*Primary Examiner* — Kyung H Shin
(74) *Attorney, Agent, or Firm* — Conley Rose, P.C.

(57) ABSTRACT

A method for unified communication of a server, a baseboard management controller, and a server is presented. A baseboard management controller (BMC) receives a first packet sent by a server, and forwards the received first packet to a physical network adapter of the BMC using a preconfigured virtual network adapter, where the first packet includes first management data or service data. The first packet is sent to an external network via the physical network adapter. The virtual network adapter is further configured to send a second packet received by the BMC to a control module of the BMC, and the control module processes the second packet. In the embodiments, the first packet is sent using an out-of-band physical network adapter of the BMC, which does not need to occupy a service network adapter of the server, thereby improving utilization of the service network adapter of the server.

17 Claims, 8 Drawing Sheets

(56) References Cited

U.S. PATENT DOCUMENTS

| | | | |
|---|---|---|---|
| 2010/0223397 A1* | 9/2010 | Elzur | H04L 41/0213 709/235 |
| 2012/0278802 A1 | 11/2012 | Nilakantan et al. | |
| 2013/0138933 A1 | 5/2013 | Wang | |

FOREIGN PATENT DOCUMENTS

| | | |
|---|---|---|
| CN | 101540694 A | 9/2009 |
| CN | 101661421 A | 3/2010 |
| CN | 101686154 A | 3/2010 |
| CN | 103577298 A | 2/2014 |
| CN | 103616937 A | 3/2014 |
| CN | 104202195 A | 12/2014 |

OTHER PUBLICATIONS

Machine Translation and Abstract of Chinese Publication No. CN101540694, Sep. 23, 2009, 6 pages.
Machine Translation and Abstract of Chinese Publication No. CN101661421, Mar. 3, 2010, 4 pages.
Machine Translation and Abstract of Chinese Publication No. CN101686154, Mar. 31, 2010, 16 pages.
Machine Translation and Abstract of Chinese Publication No. CN103577298, Feb. 12, 2014, 4 pages.
Machine Translation and Abstract of Chinese Publication No. CN104202195, Dec. 10, 2014, 19 pages.
Foreign Communication From a Counterpart Application, PCT Application No. 201410457803.X, Chinese Office Action dated Jan. 26, 2017, 7 pages.
Foreign Communication From a Counterpart Application, PCT Application No. PCT/CN2015/081072, English Translation of International Search Report dated Aug. 17, 2015, 2 pages.
Foreign Communication From a Counterpart Application, PCT Application No. PCT/CN2015/081072, English Translation of Written Opinion dated Aug. 17, 2015, 6 pages.
Foreign Communication From a Counterpart Application, European Application No. 15840857.5, Extended European Search Report dated Jul. 5, 2017, 9 pages.

* cited by examiner

METHOD FOR UNIFIED COMMUNICATION OF SERVER, BASEBOARD MANAGEMENT CONTROLLER, AND SERVER

CROSS-REFERENCE TO RELATED APPLICATIONS

This application is a continuation of International Application No. PCT/CN2015/081072, filed on Jun. 9, 2015, which claims priority to Chinese Patent Application No. 201410457803.X, filed on Sep. 10, 2014, both of which are hereby incorporated by reference in their entireties.

TECHNICAL FIELD

Embodiments of the present disclosure relate to data communications technologies, and in particular, to a method for unified communication of a server, a baseboard management controller, and a server.

BACKGROUND

There are two approaches for server management, typically management by an out-of-band baseboard management controller (BMC) or management by an in-band service network adapter. When boards in a server are managed by a BMC, an out-of-band network is used. When a status of an operating system (OS), a status of a Peripheral Component Interconnect express (PCIe) card, or a like situation is monitored, an in-band network needs to be relied on. As a result, both an in-band network and an out-of-band network are present for server management.

Most mainstream software in the industry supports both in-band management and out-of-band management, which imposes particular requirements on networking of a user. A server needs to provide a dedicated out-of-band management network adapter for out-of-band management and provide a service network adapter for transmission of in-band management data. In addition, the service network adapter can also be configured to transmit service data. Therefore, in the existing management method, one set of management needs to occupy at least two network adapters, resulting in a waste of service network adapter resources of a server.

SUMMARY

Embodiments of the present disclosure provide a method for unified communication of a server, a baseboard management controller, and a server to implement transmission of in-band and out-of-band management data using an out-of-band network in a unified manner, which does not occupy a service network adapter of a server, thereby improving utilization of the service network adapter of the server.

A first aspect of the present disclosure provides a method for unified communication of a server, where the method includes receiving, by a baseboard management controller BMC, a first packet, where the first packet includes first management data or service data, and the first packet is transmitted through a first channel, where the first channel is a communications path for transmitting the service data to an external network using a physical network adapter of the server; and forwarding, by the BMC according to a forwarding rule, the received first packet to a physical network adapter of the BMC using a preconfigured virtual network adapter, where the first packet is sent to the external network via the physical network adapter.

With reference to the first aspect of the present disclosure, in a first possible implementation manner of the first aspect of the present disclosure, the method further includes receiving, by the BMC, a second packet, where the second packet includes second management data, and the second packet is transmitted through a second channel, where the second channel is a communications path for transmitting the second management data to the external network using the physical network adapter of the BMC.

With reference to the first aspect of the present disclosure or the first possible implementation manner of the first aspect of the present disclosure, in a second possible implementation manner of the first aspect of the present disclosure, the method further includes forwarding, by the BMC, the first packet or the second packet to a control module of the BMC using the virtual network adapter, where the control module is configured to monitor a running status of the server according to the first management data included in the received first packet or the second management data included in the received second packet.

With reference to any one of the first aspect of the present disclosure, the first implementation manner of the first aspect, or the second implementation manner of the first aspect of the present disclosure, in a third possible implementation manner of the first aspect of the present disclosure, the method further includes managing, by the BMC, configuration information of the virtual network adapter, where the configuration information includes a media access control (MAC) address.

With reference to any one of the first aspect of the present disclosure, the first implementation manner of the first aspect, or the second implementation manner of the first aspect of the present disclosure, in a fourth possible implementation manner of the first aspect of the present disclosure, the forwarding rule includes the packet is forwarded to the control module of the BMC when a destination MAC address of a received packet is a MAC address of the BMC; and the packet is forwarded to the physical network adapter and sent to the external network via the physical network adapter when the destination MAC address of the packet is not the MAC address of the BMC.

With reference to the fourth possible implementation manner of the first aspect of the present disclosure, in a fifth possible implementation manner of the first aspect of the present disclosure, forwarding, by the virtual network adapter, the received first packet or second packet according to the forwarding rule includes transmitting the first packet or the second packet transparently using a bridge of the BMC; or adding an inspection point to a driver layer of the physical network adapter, and recognizing and forwarding the first packet or the second packet using the inspection point added to the driver layer of the physical network adapter.

With reference to any one of the first aspect of the present disclosure, the first implementation manner of the first aspect, or the second possible implementation manner of the first aspect of the present disclosure, in a sixth possible implementation manner of the first aspect of the present disclosure, the server and the BMC are connected using a PCIe interface to establish a data exchange path between the server and the BMC, where the data exchange path is used to transmit the first packet and the second packet.

A second aspect of the present disclosure provides a baseboard management controller BMC, including a transceiver, where a first receiving unit of the transceiver is configured to receive a first packet, where the first packet includes first management data or service data, and the first packet is transmitted through a first channel, where the first channel is a communications path for transmitting the service data to an external network using a physical network adapter of a server; a virtual network adapter configured to forward the first packet received by the transceiver to a physical network adapter of the BMC according to a forwarding rule; and the physical network adapter configured to send the first packet to the external network.

With reference to the second aspect of the present disclosure, in a first possible implementation manner of the second aspect of the present disclosure, the transceiver further includes a second receiving unit, where the second receiving unit is configured to receive a second packet, where the second packet includes second management data, and the second packet is transmitted through a second channel, where the second channel is a communications path for transmitting the second management data to the external network using the physical network adapter of the BMC.

With reference to the first possible implementation manner of the second aspect of the present disclosure, in a third possible implementation manner of the second aspect of the present disclosure, the second management data includes temperatures, voltages, and currents of a mainboard, a central processing unit (CPU), and a fan that are of the server.

With reference to the second aspect of the present disclosure or the first possible implementation manner of the second aspect of the present disclosure, in a second possible implementation manner of the second aspect of the present disclosure, the baseboard management controller further includes a control module; the virtual network adapter is further configured to forward the first packet or the second packet to the control module; and the control module is configured to monitor a running status of the server according to the first management data included in the received first packet or the second management data included in the received second packet.

With reference to any one of the second aspect of the present disclosure, or the first implementation manner of the first aspect, or the second possible implementation manner of the second aspect of the present disclosure, in the third possible implementation manner of the second aspect of the present disclosure, the BMC further includes a management module configured to manage configuration information of the virtual network adapter, where the configuration information includes a media access control MAC address.

With reference to any one of the second aspect of the present disclosure, or the first implementation manner of the first aspect, or the second possible implementation manner of the second aspect of the present disclosure, in a fourth possible implementation manner of the second aspect of the present disclosure, the forwarding rule includes the packet is forwarded to the control module of the BMC when a destination MAC address of a received packet is a MAC address of the BMC; and the packet is forwarded to the physical network adapter and sent to the external network via the physical network adapter when the destination MAC address of the packet is not the MAC address of the BMC.

With reference to the fourth possible implementation manner of the second aspect of the present disclosure, in a fifth possible implementation manner of the second aspect of the present disclosure, the BMC further includes a bridge; and the virtual network adapter is further configured to transmit the first packet or the second packet transparently using the bridge; or add an inspection point to a driver layer of the physical network adapter, and recognize and forward the first packet or the second packet using the inspection point added to the driver layer of the physical network adapter.

With reference to any one of the second aspect of the present disclosure, or the first implementation manner of the first aspect, or the second possible implementation manner of the second aspect of the present disclosure, in a sixth possible implementation manner of the second aspect of the present disclosure, the server and the BMC are connected using a PCIe interface to establish a data exchange path between the server and the BMC, where the data exchange path is used to transmit the first packet and the second packet.

A third aspect of the present disclosure provides a server, where the server includes a processor, a memory, a baseboard management controller BMC, and a system bus, where the memory and the BMC are connected to and complete mutual communication with the processor using the system bus, where the memory is configured to store a computer executable instruction; the processor is configured to execute the computer executable instruction to send a first packet to the BMC; the BMC is configured to receive the first packet, where the first packet includes first management data or service data, and the first packet is transmitted through a first channel, where the first channel is a communications path for transmitting the service data to an external network using a physical network adapter of the server; and the BMC is further configured to forward, according to a forwarding rule, the received first packet to a physical network adapter of the BMC using a preconfigured virtual network adapter, where the first packet is sent to the external network via the physical network adapter.

With reference to the third aspect of the present disclosure, in a first possible implementation manner of the third aspect of the present disclosure, the processor is further configured to execute the computer executable instruction to send a second packet to the BMC; and correspondingly, the BMC is further configured to receive the second packet, where the second packet includes second management data, and the second packet is transmitted through a second channel, where the second channel is a communications path for transmitting the second management data to the external network using the physical network adapter of the BMC.

With reference to the third aspect of the present disclosure or the first possible implementation manner of the third aspect of the present disclosure, in a second possible implementation manner of the third aspect of the present disclosure, the BMC is further configured to forward the first packet or the second packet to a control module of the BMC using the virtual network adapter, where the control module is configured to monitor a running status of the server according to the first management data included in the received first packet or the second management data included in the received second packet.

With reference to any one of the third aspect of the present disclosure, or the first implementation manner of the first aspect, or the second possible implementation manner of the third aspect of the present disclosure, in a third possible implementation manner of the third aspect of the present disclosure, the forwarding rule includes the packet is forwarded to the control module of the BMC when a destination MAC address of a received packet is a MAC address of the BMC; and the packet is forwarded to the physical network adapter and sent to the external network via the physical network adapter when the destination MAC address of the packet is not the MAC address of the BMC.

With reference to the third possible implementation manner of the third aspect of the present disclosure, in a fourth possible implementation manner of the third aspect of the present disclosure, forwarding, by the virtual network adapter, the received first packet or second packet according to the forwarding rule includes transmitting the first packet or the second packet transparently using a bridge of the BMC; or adding an inspection point to a driver layer of the physical network adapter, and recognizing and forwarding the first packet or the second packet using the inspection point added to the driver layer of the physical network adapter.

According to the method for unified communication of a server, the baseboard management controller, and the server that are provided in the embodiments of the present disclosure, a BMC receives a first packet sent by a server, and forwards the received first packet to a physical network adapter of the BMC using a preconfigured virtual network adapter, where the first packet includes first management data or service data. The first packet is sent to an external network via the physical network adapter. The virtual network adapter is further configured to send a second packet received by the BMC to a control module of the BMC, and the control module processes the second packet. In the prior art, the first packet is sent using an in-band network, which needs to occupy a service network adapter of a server. In the embodiments, the first packet is sent using an out-of-band physical network adapter of the BMC, which does not need to occupy a service network adapter of the server, thereby improving utilization of the service network adapter of the server.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skills in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In an existing server communication method, a first packet may be an in-band packet, and a second packet may be an out-of-band packet. The in-band packet includes in-band management data or service data. An in-band packet carrying in-band management data and an in-band packet carrying service data are both transmitted to an external network using a physical network adapter of a server. When the server is configured with multiple physical network adapters, the service data and the first management data may be sent using a same physical network adapter of the server or using different physical network adapters of the server. The out-of-band packet includes out-of-band management data. Out-of-band management data carried in an out-of-band packet is transmitted through a channel different from that for transmitting service data. That is, the out-of-band management data is sent to an external network using a physical network adapter of a BMC, and the service data is sent to an external network using a physical network adapter of a server. In the embodiments of the present disclosure, a first packet includes first management data and service data, and a second packet includes second management data. In the embodiments of the present disclosure, the first management data is equivalent to the in-band management data, and the second management data is equivalent to the out-of-band management data. Therefore, as can be known, the first packet is sent using an in-band network, and the second packet is sent using an out-of-band network. In a method for unified communication of a server according to the embodiments of the present disclosure, both the first packet and the second packet can be sent using an out-of-band network. The following describes the method for unified communication of a server of the present disclosure in detail using specific embodiments.

Figure 1:
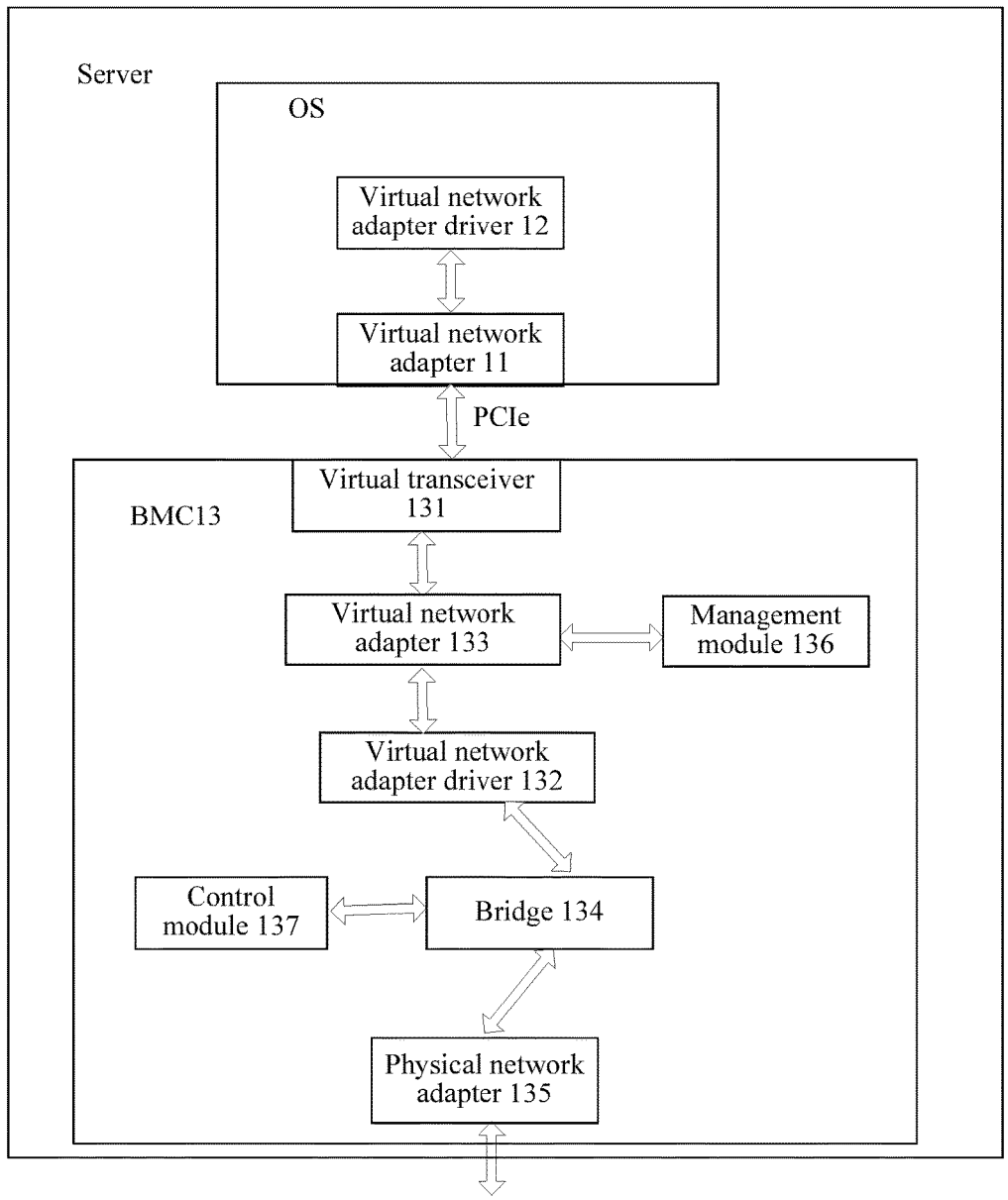
FIG. 1 is a schematic structural diagram of a server according to an embodiment of the present disclosure.

FIG. 1 is a schematic structural diagram of a server according to an embodiment of the present disclosure. As shown in FIG. 1, the server includes a virtual network adapter 11, a virtual network adapter driver 12, and a BMC 13. The BMC 13 is configured on a baseboard of the server. The baseboard of the server is connected to the BMC 13 using a standard PCIe interface. The BMC 13 monitors a running status of the server using a sensor, and manages hardware and clears faults according to obtained status information. In addition, the BMC 13 communicates with a system administrator using an independent connection line. The BMC is a part of an Intelligent Platform Management Interface (IPMI) and is generally included in a main circuit board of a monitored device. In this embodiment, the BMC 13 is configured on the baseboard of the server. Certainly, the BMC 13 may alternatively be used as an independent device to connect to the baseboard of the server.

In this embodiment, the BMC 13 includes a virtual transceiver 131, a virtual network adapter driver 132, a virtual network adapter 133, a bridge 134, a physical network adapter 135, a management module 136, and a control module 137.

The virtual network adapter 11 is configured to receive first management data or service data sent by an upper-layer application of an OS, encapsulate the first management data or the service data into a first packet, and send the first packet to the BMC 13. The virtual network adapter 11 is obtained by the virtual network adapter driver 12 by means of software simulation. The virtual network adapter 11 has functions of a real physical network adapter and may be directly used by all upper-layer application software of the server. Therefore, in the method in this embodiment of the present disclosure, more management functions are provided. However, a BMC driver on a server side supports only a few management functions that are dependent on application software developed by a specific vendor, and the BMC driver has an interface with only the application software provided by the specific vendor. Therefore, the BMC driver can obtain only status information of the application software provided by the specific vendor as first management data, but does not support management of third-party application software, and therefore is not extensive. In contrast, in the method in this embodiment of the present disclosure, the virtual network adapter 11 has all functions of a real physical network adapter. With this commonality, the virtual network adapter 11 can support management of third-party application software.

As a real physical network adapter does, the virtual network adapter 11 is also configured with a MAC address, an Internet Protocol (IP) address, a virtual local area network (VLAN), and the like. The virtual network adapter 11 may be configured and managed by the management module 136 of the BMC 13.

The virtual network adapter driver 12 is configured to simulate the virtual network adapter 11 for data exchange with the virtual transceiver 131. As viewed from an OS side, a transceiver interface of a standard network adapter is provided, and this transceiver interface is the virtual network adapter 11.

It can be understood by persons skilled in the art that a physical network adapter cannot work alone but can work normally only when a network adapter driver is configured to drive the physical network adapter. In this embodiment, the virtual network adapter 11 may serve as a physical network adapter, and the virtual network adapter 11 has all functions of a physical network adapter. Therefore, the virtual network adapter 11 also requires a driver, and the virtual network adapter driver 12 is the driver of the virtual network adapter 11. To clearly describe a relationship between the virtual network adapter 11 and the virtual network adapter driver 12, the two modules are separately drawn in FIG. 1. In other drawings of the embodiments of the present disclosure, the virtual network adapter 11 and the virtual network adapter driver 12 may serve as one functional module. That is, only the virtual network adapter 11 or the virtual network adapter driver 12 is drawn.

The virtual network adapter 11 sends the first packet to the BMC, such that the BMC sends the first packet to an external network using the virtual network adapter 133. First management data carried in the first packet is obtained by monitoring software of the server. The first management data mainly includes a status parameter of an OS, a status parameter of service software, or a status parameter of a hardware component. Herein, the service software includes application software embedded into the server and third-party application software. The hardware component includes a CPU, a memory, a hard disk, a compact disc (CD) drive, a network adapter, and a graphics card that are of the server. A status parameter of the CPU is a utilization rate, a clock speed, and the like of the CPU.

The virtual transceiver 131, on one hand, implements data exchange with the virtual network adapter 11 to receive the first packet sent by the virtual network adapter 11. On the other hand, the virtual transceiver 131 interconnects with the virtual network adapter 133 of the BMC 13 to send the received first packet to the virtual network adapter 133.

The virtual network adapter 133 also requires a driver, and the virtual network adapter driver 132 is the driver of the virtual network adapter 133. The virtual network adapter driver 132 provides a transceiver interface of a standard network adapter. This transceiver interface is the virtual network adapter 133. The virtual network adapter 133 is configured to interconnect with the virtual transceiver 131 to forward the first packet received by the virtual transceiver 131. To clearly describe a relationship between the virtual network adapter 133 and the virtual network adapter driver 132, the two modules are separately drawn in FIG. 1. In other drawings of the embodiments of the present disclosure, the virtual network adapter 133 and the virtual network adapter driver 132 may serve as one functional module. That is, only the virtual network adapter 133 or the virtual network adapter driver 132 is drawn.

The virtual network adapter 133 is also configured with a MAC address, an IP address, a VLAN, and the like. The virtual network adapter 133 is configured to send the received first packet to the bridge 134 or send a received second packet to the bridge 134. The second packet includes second management data. The second management data includes temperatures, voltages, currents, and like information of devices such as the baseboard, the CPU, and a fan of the server. Generally, the first management data can be obtained only when the server is powered on and running, while the second management data can be obtained even when the server is powered off.

The virtual network adapter 133 is further configured to send the first packet or the second packet to the control module 137. The control module 137 is configured to monitor a running status of the server according to the management data carried in the received first packet or second packet.

The bridge 134 is configured to transparently transmit the first packet or the second packet sent by the virtual network adapter 133 to send the first packet or the second packet to the physical network adapter 135, or the bridge 134 transparently transmits the first packet or the second packet sent by the virtual network adapter 133 to the control module 137.

The physical network adapter 135 is configured to send the received first packet or second packet to the external network.

The first packet is sent using an in-band network and the second packet is sent using an out-of-band network. The first packet may be in-band data, and the second packet may be out-of-band data. In this embodiment of the present disclosure, both the first packet and the second packet may be sent to the external network using the physical network adapter 135. In this way, all in-band data and out-of-band data are sent using a unified out-of-band network adapter, while no service network adapter of the server is occupied. Therefore, utilization of the service network adapter of the server is improved.

The management module 136 is configured to manage the virtual network adapter 133 and the virtual transceiver 131, for example, to configure and manage MAC addresses, IP addresses, and VLANs of the virtual network adapter 133 and the virtual transceiver 131. The virtual network adapter 133 and the virtual transceiver 131 are managed by the BMC rather than requiring management by the server. Therefore, management becomes more convenient. The management module 136 is further configured to configure and manage the virtual network adapter 11, thereby implementing unified out-of-band management. The management module 136 is configured mainly to configure and manage the MAC address, the IP address, and the VLAN of the virtual network adapter 11. A dedicated PCIe management path may be configured between the server and the BMC for sending management data of the virtual network adapter 11. Certainly, a data exchange path between the BMC and the server may alternatively be used to send management data of the virtual network adapter 11.

Figure 2:
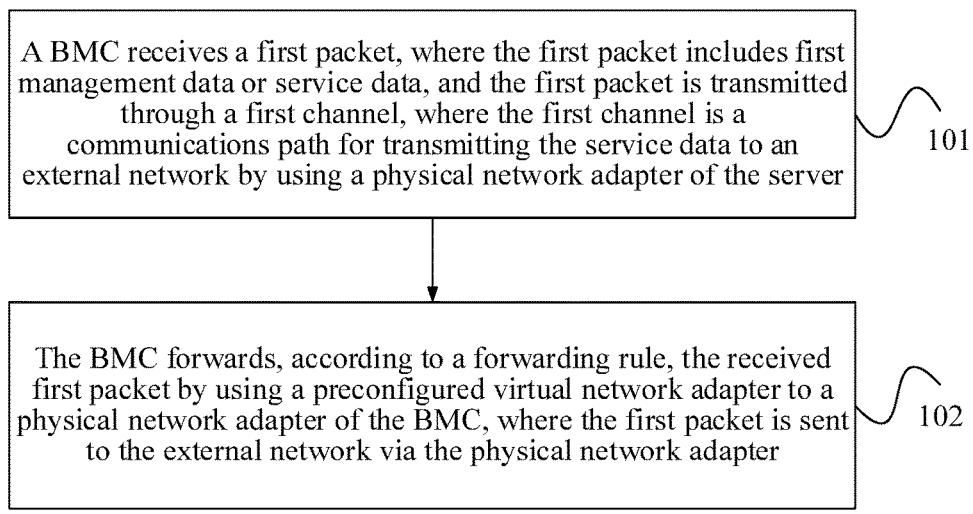
FIG. 2 is a flowchart of a method for unified communication of a server according to Embodiment 1 of the present disclosure.

FIG. 2 is a flowchart of a method for unified communication of a server according to Embodiment 1 of the present disclosure. The method for unified communication of a server according to this embodiment is described in detail with reference to FIG. 1 and FIG. 2. As shown in FIG. 2, the method in this embodiment includes the following steps.

Step 101: A BMC receives a first packet, where the first packet includes first management data or service data, and the first packet is transmitted through a first channel, where the first channel is a communications path for transmitting the service data to an external network using a physical network adapter of the server.

The server is connected to the BMC using a PCIe interface to establish a data exchange path between the server and the BMC, where the data exchange path is used to transmit the first packet. The server sends the first packet to the BMC using the data exchange path. The first packet is sent by a virtual network adapter 11 of the server. The BMC receives the first packet, and the first packet includes the first management data or the service data. The first packet is received by a virtual transceiver 131 of the BMC. The virtual transceiver 131 may receive the first packet using a PCIe direct memory access (DMA) method.

The first packet may be an in-band packet sent to an external network using an in-band network of the server. The first packet is transmitted through a first channel. The first channel is a communications path for transmitting the service data to the external network using a physical network adapter of the server. When the server is configured with multiple physical network adapters, the service data and the first management data may be sent using a same physical network adapter of the server or using different physical network adapters of the server.

In this embodiment, in order to enable in-band data and out-of-band data to be sent using a unified out-of-band interface, the server needs to send the first packet to the BMC, and then the first packet is sent to the external network using a physical network adapter 135 of the BMC. That is, both the first management data and the service data may be transmitted using the same physical network adapter 135.

Step 102: The BMC forwards, according to a forwarding rule, the received first packet to a physical network adapter of the BMC using a preconfigured virtual network adapter, where the first packet is sent to the external network via the physical network adapter.

After receiving the first packet, the virtual transceiver 131 sends the first packet to a virtual network adapter 133 of the BMC. The virtual network adapter 133 sends the first packet to the physical network adapter 135 of the BMC according to the forwarding rule. The first packet is sent to the external network via the physical network adapter 135.

The forwarding rule for the virtual network adapter 133 includes the packet is forwarded to a control module 137 of the BMC when a destination MAC address of a received packet is a MAC address of the BMC, where the control module 137 monitors a running status of the server according to the first management data included in the received first packet; and the packet is forwarded to the physical network adapter 135 and sent to the external network via the physical network adapter 135 when the destination MAC address of the packet is not the MAC address of the BMC.

The first packet also includes address information, such as a source IP address, a source MAC address, a destination IP address, a destination MAC address and the like. The source IP address of the first packet is an IP address of the virtual network adapter 11, and the source MAC address of the first packet is a MAC address of the virtual network adapter 11. When the first packet is to be sent to the control module 137 for processing, the destination MAC address of the first packet is the MAC address of the BMC. When the first packet is to be sent to a management device on the external network, the destination IP address of the first packet is an IP address of the management device, and the destination MAC address of the first packet is a MAC address of the management device.

After receiving the first packet, the virtual network adapter 133 determines whether the destination MAC address of the first packet is the MAC address of the BMC. The first packet is sent to the control module 137 when the destination MAC address of the first packet is the MAC address of the BMC. The first packet is sent to the physical network adapter 135 when the destination MAC address of the first packet is not the MAC address of the BMC.

In this embodiment, that the virtual network adapter 133 forwards the received first packet according to the forwarding rule is transmitting the first packet transparently using a bridge 134 of the BMC, where the first packet is sent to the physical network adapter 135 via the bridge 134; or adding an inspection point to a driver layer of the physical network adapter 135, and recognizing and forwarding the first packet using the inspection point added to the driver layer of the physical network adapter 135.

The BMC is further configured to receive a second packet, where the second packet includes second management data, and the second management data and the service data are transmitted through different logical channels. The BMC receives the second packet using the data exchange path established between the server and the BMC. The second packet is still sent using an out-of-band network. After receiving the second packet, the BMC forwards the second packet to the physical network adapter 135 using the virtual network adapter 133, and then the second packet is sent to the external network via the physical network adapter 135. The virtual network adapter 133 still forwards the second packet using the foregoing forwarding rule, and details are not described herein again. Alternatively, the virtual network adapter 133 sends the second packet to the control module 137 of the BMC, where the control module 137 monitors the running status of the server according to the second management data included in the received second packet.

It should be noted that, in this embodiment, if the server needs to send the first packet to the BMC and then to the external network using the virtual network adapter 133 of the BMC, routing information of the first packet needs to be preconfigured and stored in the server for the server to forward the first packet according to the routing information. In this embodiment, the first packet needs to be sent to the external network using the physical network adapter 135 of the BMC. Therefore, the server needs to be configured with a forwarding network segment of the physical network adapter 135, and the IP address of the first packet belongs to the forwarding network segment of the physical network adapter 135. When receiving the first packet sent by upper-layer application software, the server determines, according to the routing information, that the first packet should be sent using the physical network adapter 135. In this case, the server sends the first packet to the BMC, and then the first packet is sent to the physical network adapter 135 using the virtual network adapter 133 of the BMC.

In this embodiment, a BMC receives a first packet sent by a server, and forwards the received first packet to a physical network adapter of the BMC using a preconfigured virtual network adapter, where the first packet includes first management data or service data. The first packet is sent to an external network via the physical network adapter. The virtual network adapter is further configured to send a received second packet to a control module of the BMC, and the control module processes the second packet. The first packet is sent using an in-band network, which needs to occupy a service network adapter of a server. In this embodiment, both the first packet and the second packet are sent using an out-of-band physical network adapter of the BMC, which does not need to occupy a service network adapter of the server, thereby improving utilization of the service network adapter of the server.

In the foregoing Embodiment 1, both the first management data and the service data are sent to the external network by the physical network adapter of the BMC. A benefit is that all data is sent using a unified out-of-band physical network adapter. Generally, it is desired to separate service data and management data, that is, service data and management data are transmitted through different channels. Optionally, in the solution of this embodiment of the present disclosure, the service data may be sent using a service network adapter of the server, and only the first management data is sent using the physical network adapter of the BMC. That is, all management data is sent using an out-of-band network, and all service data is sent using an in-band network. In this way, service data or management data can be separated, thereby ensuring reliability for service data transmission.

Figure 3A:
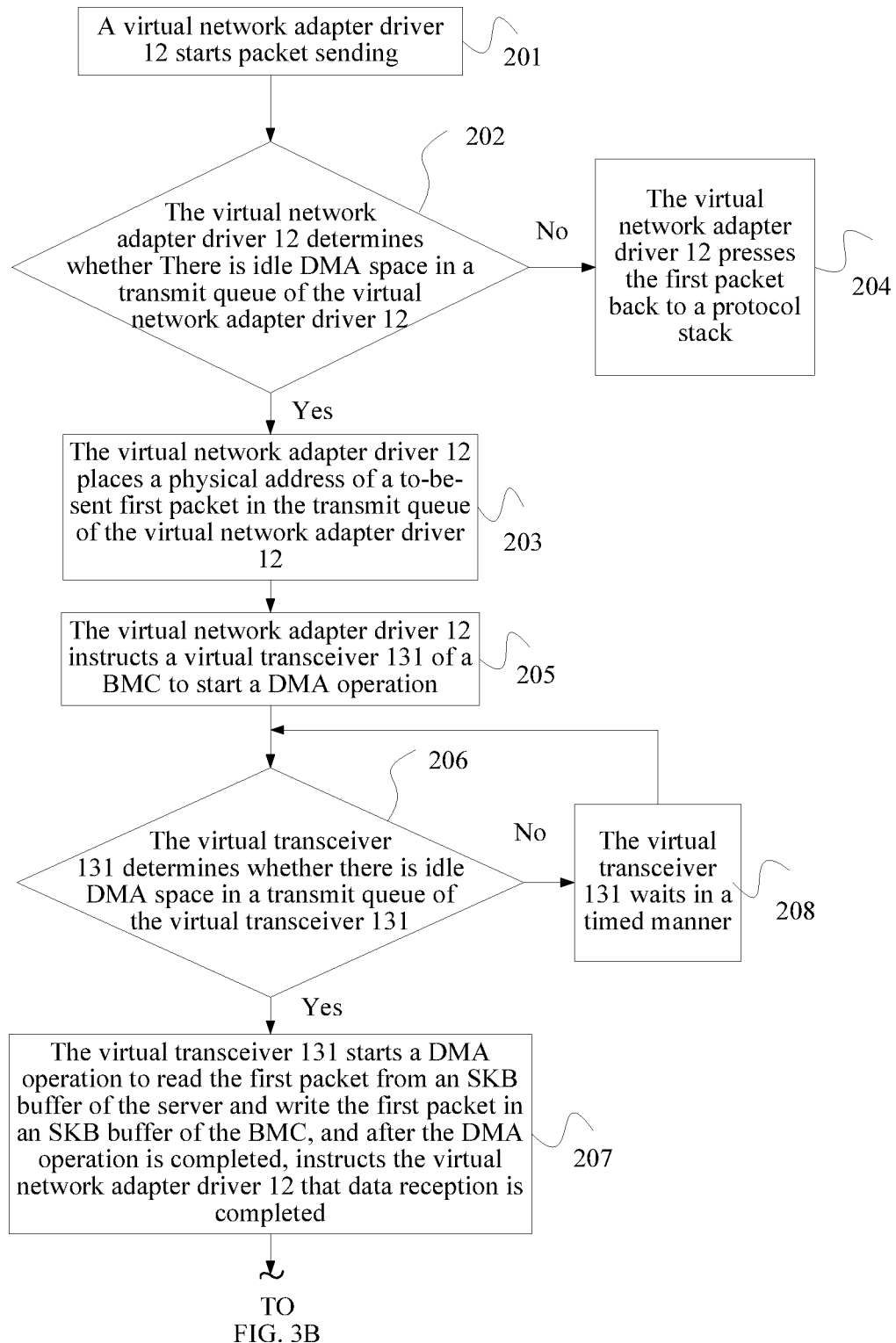
FIG. 3A and FIG. 3B are a flowchart of forwarding a first packet according to Embodiment 2 of the present disclosure.
Figure 3B:
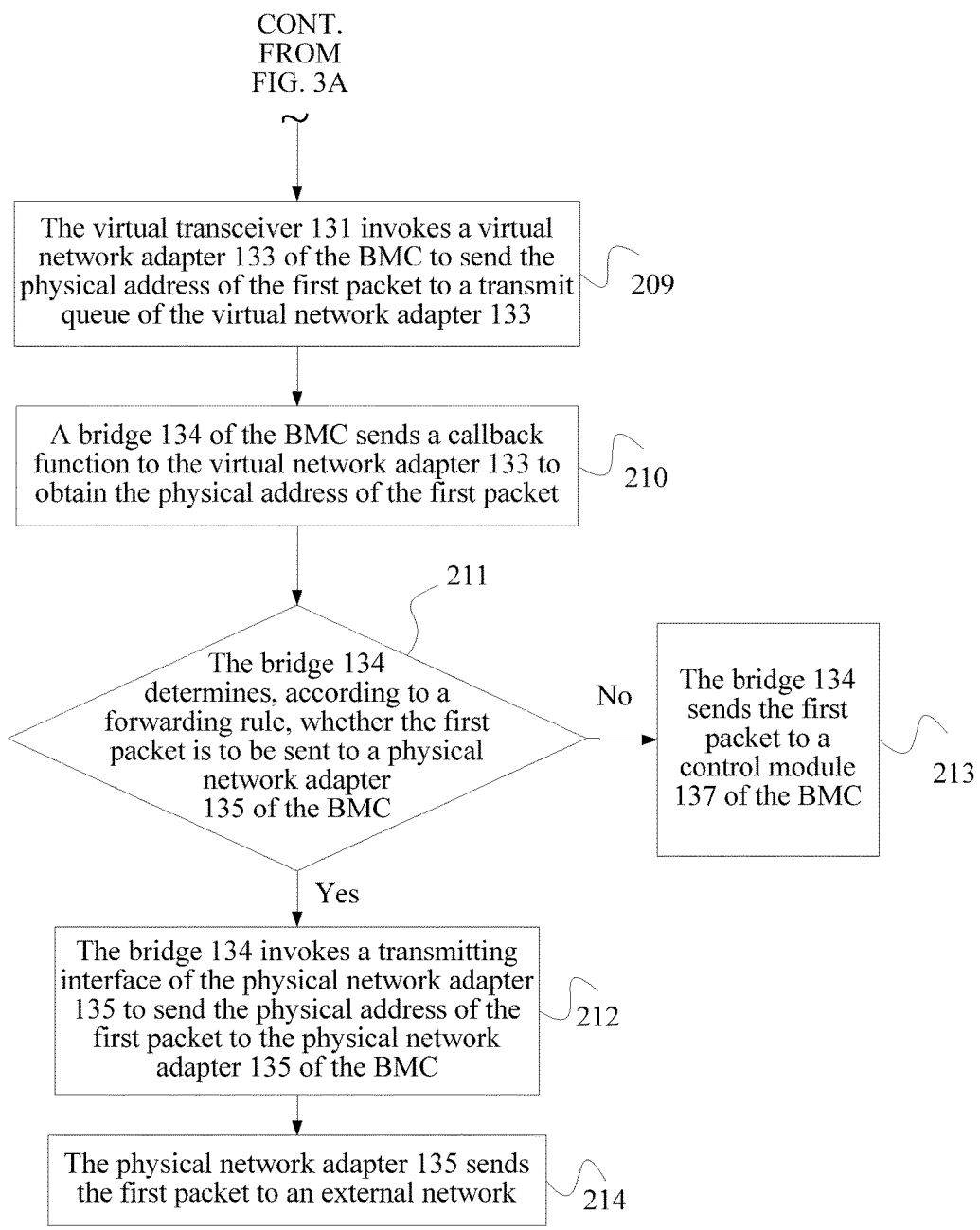

Based on the foregoing Embodiment 1, a procedure for forwarding a first packet is described in detail in Embodiment 2 of the present disclosure. In Embodiment 2 of the present disclosure, the server exchanges data with the BMC using transmit and receive queues. FIG. 3A and FIG. 3B are a flowchart of forwarding a first packet according to Embodiment 2 of the present disclosure. Referring to FIG. 1, FIG. 3A, and FIG. 3B, a procedure for forwarding a first packet in this embodiment includes the following steps.

Step 201: A virtual network adapter driver 12 starts packet sending.

When there is a first packet to be sent on the server, an OS of the server compresses the to-be-sent first packet to a protocol stack. When detecting the to-be-sent data in the protocol stack, the virtual network adapter driver 12 starts packet sending.

Step 202: The virtual network adapter driver 12 determines whether there is idle DMA space in a transmit queue of the virtual network adapter driver 12.

Between the server and the BMC, data is transmitted and received in a PCIe DMA manner. If there is idle DMA space in the transmit queue of the virtual network adapter driver 12, step 203 is performed. If there is no idle DMA space in the transmit queue of the virtual network adapter driver 12, step 204 is performed.

Step 203: The virtual network adapter driver 12 places a physical address of a to-be-sent first packet in the transmit queue of the virtual network adapter driver 12.

The server allocates a Socket Buffer (SKB) buffer in a memory and stores the to-be-sent first packet in the SKB buffer. The physical address of the first packet is received and placed in the protocol stack. The protocol stack then places the physical address of the first packet in the transmit queue of the virtual network adapter driver 12. Herein, the physical address of the first packet is a memory address of the first packet in the SKB buffer of the server.

Step 205 is performed after step 203.

Step 204: The virtual network adapter driver 12 presses the first packet back to the protocol stack.

Step 205: The virtual network adapter driver 12 instructs a virtual transceiver 131 of the BMC to start a DMA operation.

Step 206: The virtual transceiver 131 determines whether there is idle DMA space in a receive queue of the virtual transceiver 131.

If there is idle DMA space in the receive queue of the virtual transceiver 131, step 207 is performed. If there is no idle DMA space in the receive queue of the virtual transceiver 131, step 208 is performed.

Step 207: The virtual transceiver 131 starts a DMA operation, to read the first packet from an SKB buffer of the server and write the first packet into an SKB buffer of the BMC, and after the DMA operation is completed, instructs the virtual network adapter driver 12 that data reception is completed.

After receiving the instruction from the virtual network adapter driver 12, the virtual transceiver 131 allocates an SKB buffer in a local memory of the BMC, and after the SKB buffer is successfully allocated, triggers the DMA operation to read the first packet and write the first packet into the SKB buffer of the BMC according to the physical address of the first packet. After the DMA operation is completed, the virtual transceiver 131 instructs the virtual network adapter driver 12, by means of an interrupt, that data has been successfully received. The virtual network adapter driver 12 releases the SKB buffer in the memory of the server, and the packet sending on the server side is completed. Step 209 is performed after step 207.

Step 208: The virtual transceiver 131 waits in a timed manner.

When there is no idle DMA space in the receive queue of the virtual transceiver 131, the virtual transceiver 131 needs to wait. When a waiting time expires, the virtual transceiver 131 goes back to perform step 206, continuing to determine whether there is idle DMA space in the receive queue of the virtual transceiver 131.

Step 209: The virtual transceiver 131 invokes a virtual network adapter 133 of the BMC to send the physical address of the first packet to a transmit queue of the virtual network adapter 133.

In this step and all subsequent steps of this embodiment, the involved physical address of the first packet is an address of the first packet in the SKB buffer of the server.

Step 210: A bridge 134 of the BMC sends a callback function to the virtual network adapter 133 to obtain the physical address of the first packet.

By sending the callback function to the virtual network adapter 133, the bridge 134 adds the physical address of the first packet to a transmit queue of the bridge 134. The callback function may be a hook function.

Step 211: The bridge 134 determines, according to a forwarding rule, whether the first packet is to be sent to a physical network adapter 135 of the BMC.

The bridge 134 determines whether a destination MAC address of the first packet is a MAC address of the BMC. If the destination MAC address of the first packet is not the MAC address of the BMC, step 212 is performed. If the destination MAC address of the first packet is the MAC address of the BMC, step 213 is performed.

Step 212: The bridge 134 invokes a transmitting interface of the physical network adapter 135 to send the physical address of the first packet to the physical network adapter 135 of the BMC.

Step 214 is performed after step 212.

Step 213: The bridge 134 sends the first packet to a control module 137 of the BMC.

Step 214: The physical network adapter 135 sends the first packet to an external network.

The physical network adapter 135 reads the first packet from the SKB buffer of the BMC according to the physical address of the first packet, and sends the first packet to the external network.

Figure 4A:
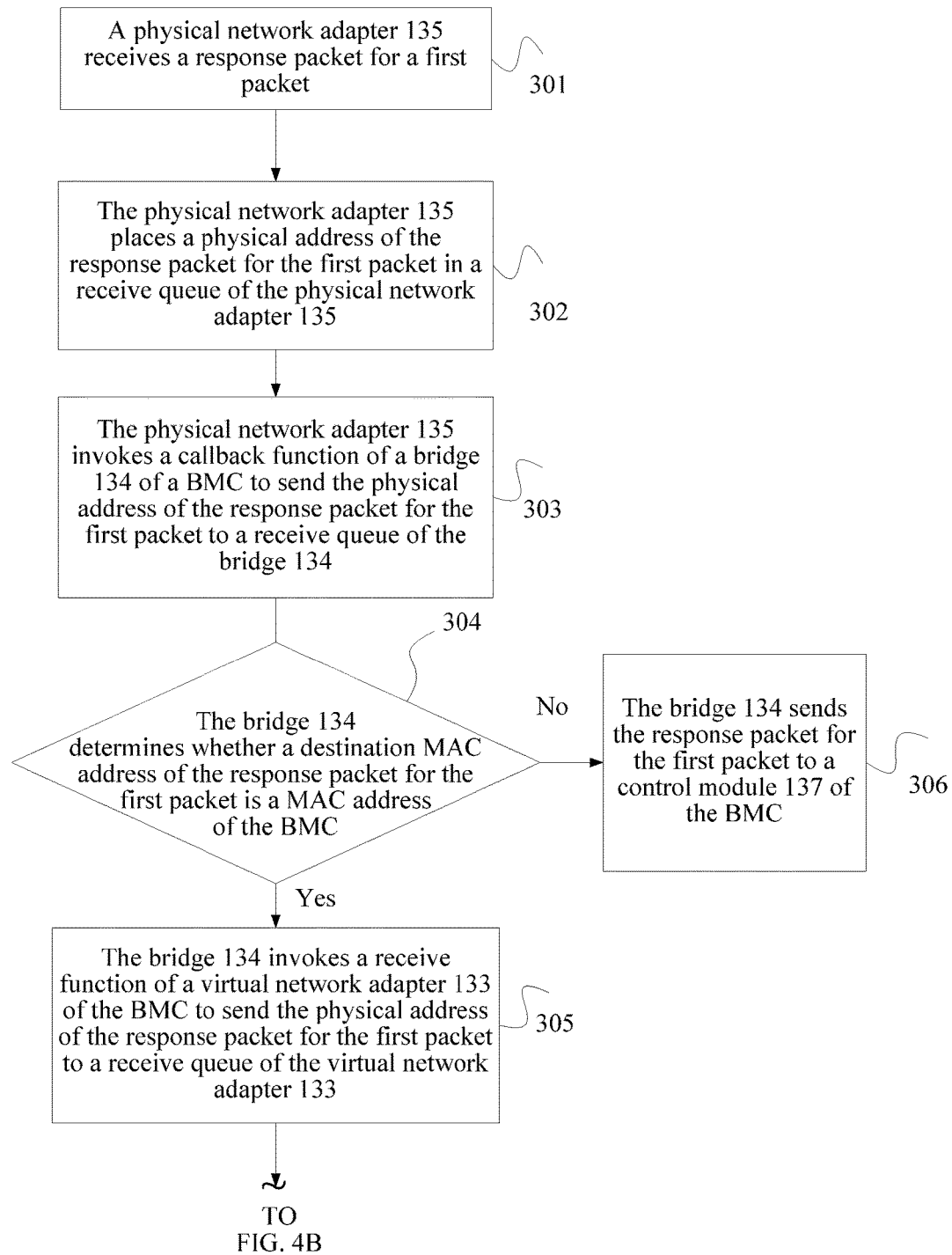
FIG. 4A and FIG. 4B are a flowchart of forwarding a response packet for a first packet according to Embodiment 3 of the present disclosure.
Figure 4B:
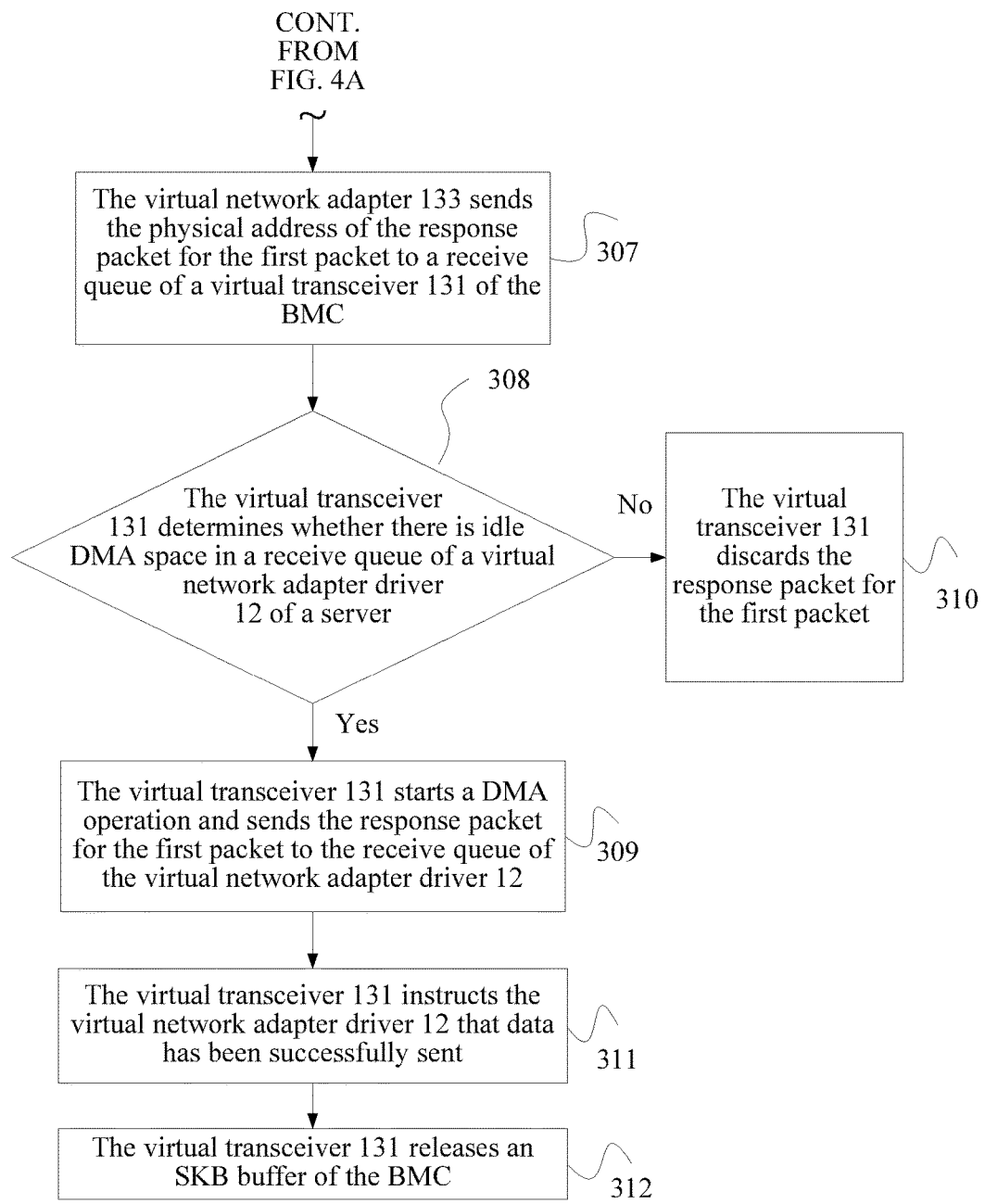

After the BMC sends the first packet to a management device on the external network, the management device returns a response packet for the first packet to the server. A procedure for forwarding the response packet for the first packet is further described in Embodiment 3 of the present disclosure. FIG. 4A and FIG. 4B are a flowchart of forwarding a response packet for a first packet according to Embodiment 3 of the present disclosure. Referring to FIG. 1, FIG. 4A, and FIG. 4B, a procedure for forwarding a response packet for a first packet according to this embodiment includes the following steps.

Step 301: A physical network adapter 135 receives a response packet for a first packet.

The response packet for the first packet that is received by the physical network adapter 135 is placed in an SKB buffer pre-allocated in a memory of a BMC.

Step 302: The physical network adapter 135 places a physical address of the response packet for the first packet in a receive queue of the physical network adapter 135.

The physical address of the response packet for the first packet is a memory address of the first packet in an SKB buffer of the BMC.

Step 303: The physical network adapter 135 invokes a callback function of a bridge 134 of the BMC to send the physical address of the response packet for the first packet to a receive queue of the bridge 134.

Step 304: The bridge 134 determines whether a destination MAC address of the response packet for the first packet is a MAC address of the BMC.

If the destination MAC address of the response packet for the first packet is not the MAC address of the BMC, step 305 is performed. If the destination MAC address of the response packet for the first packet is the MAC address of the BMC, step 306 is performed.

Step 305: The bridge 134 invokes a receive function of a virtual network adapter 133 of the BMC to send the physical address of the response packet for the first packet to a receive queue of the virtual network adapter 133.

Step 307 is performed after step 305.

Step 306: The bridge 134 sends the response packet for the first packet to a control module 137 of the BMC.

Step 307: The virtual network adapter 133 sends the physical address of the response packet for the first packet to a receive queue of a virtual transceiver 131 of the BMC.

Step 308: The virtual transceiver 131 determines whether there is idle DMA space in a receive queue of a virtual network adapter driver 12 of a server.

If there is idle DMA space in the receive queue of the virtual network adapter driver 12, step 309 is performed. If there is no idle DMA space in the receive queue of the virtual network adapter driver 12, step 310 is performed.

Step 309: The virtual transceiver 131 starts a DMA operation and sends the response packet for the first packet to the receive queue of the virtual network adapter driver 12.

Step 311 is performed after step 309.

Step 310: The virtual transceiver 131 discards the response packet for the first packet.

Step 311: The virtual transceiver 131 instructs the virtual network adapter driver 12 that data has been successfully sent.

After receiving the instruction from the virtual transceiver 131, the virtual network adapter driver 12 transfers the response packet for the first packet to a protocol stack. The reception on the OS side is completed.

Step 312: The virtual transceiver 131 releases the SKB buffer of the BMC.

Figure 5:
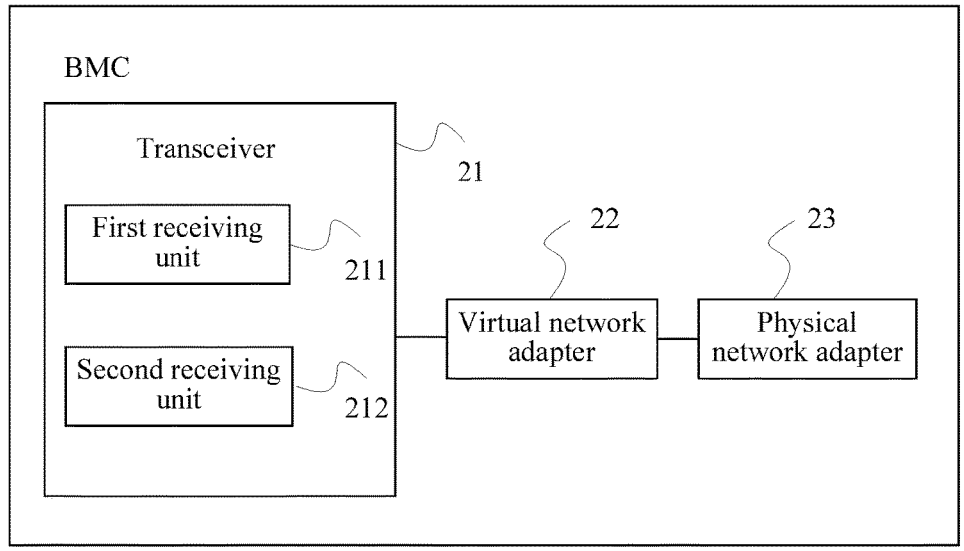
FIG. 5 is a schematic structural diagram of a BMC according to Embodiment 4 of the present disclosure.

FIG. 5 is a schematic structural diagram of a BMC according to Embodiment 4 of the present disclosure. As shown in FIG. 5, the BMC according to this embodiment includes a transceiver 21, a virtual network adapter 22, and a physical network adapter 23.

Herein, the transceiver 21 includes a first receiving unit 211. The first receiving unit 211 is configured to receive a first packet, where the first packet includes first management data or service data, and the first packet is transmitted through a first channel. The first channel is a communications path for transmitting the service data to an external network using a physical network adapter of the server.

The virtual network adapter 22 is configured to forward the first packet received by the virtual transceiver to a physical network adapter of the BMC according to a forwarding rule.

The physical network adapter 23 is configured to send the first packet to the external network.

Further, the transceiver 21 further includes a second receiving unit 212. The second receiving unit 212 is configured to receive a second packet, where the second packet includes second management data, and the second packet is transmitted through a second channel. The second channel is a communications path for transmitting the second management data to the external network using the physical network adapter of the BMC.

In this embodiment, the first management data includes a status parameter of an operating system OS of the server, a status parameter of service software of the server, or a status parameter of a hardware component of the server. The service software includes application software embedded into the server and third-party application software, and the hardware component includes a CPU, a memory, a hard disk, a compact disc drive, a network adapter, and a graphics card that are of the server. The second management data includes temperatures, voltages, and currents of a mainboard, the CPU, and a fan that are of the server.

In this embodiment, the server and the BMC are connected using a PCIe interface to establish a data exchange path between the server and the BMC. The data exchange path is used to transmit the first packet and the second packet.

The forwarding rule includes the packet is forwarded to a control module of the BMC when a destination MAC address of a received packet is a MAC address of the BMC; and the packet is forwarded to the physical network adapter 23 and sent to the external network via the physical network adapter 23 when the destination MAC address of the packet is not the MAC address of the BMC.

The BMC in this embodiment may be configured to execute the technical solution in Embodiment 1. Specific implementation manners and technical effects thereof are similar, and details are not described herein again.

Figure 6:
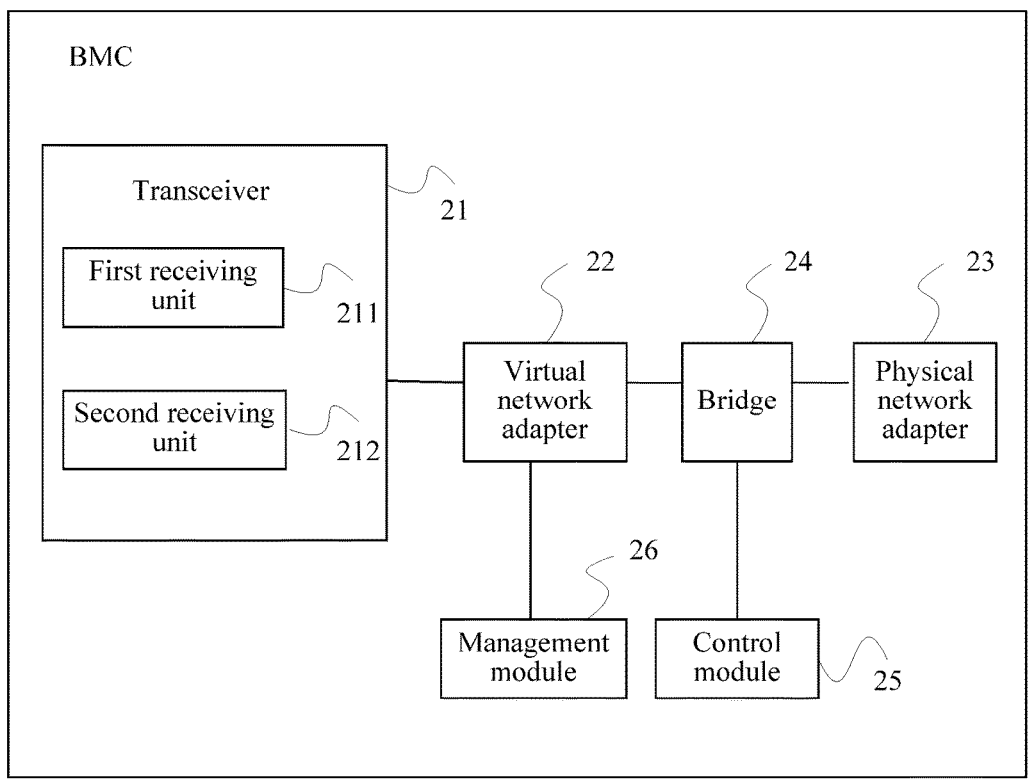
FIG. 6 is a schematic structural diagram of a BMC according to Embodiment 5 of the present disclosure.

FIG. 6 is a schematic structural diagram of a BMC according to Embodiment 5 of the present disclosure. Based on the BMC shown in FIG. 5, the BMC in this embodiment further includes a bridge 24, a control module 25, and a management module 26.

The control module 25 is configured to monitor a running status of the server according to the first management data included in the received first packet or the second management data included in the received second packet. Correspondingly, the virtual network adapter 22 is further configured to forward the first packet or the second packet to the control module 25.

The virtual network adapter 22 is further configured to transmit the first packet or the second packet transparently using the bridge 24; or add an inspection point to a driver layer of the physical network adapter 23, and recognize and forward the first packet or the second packet using the inspection point added to the driver layer of the physical network adapter 23.

The management module 26 is configured to manage configuration information of the virtual network adapter 22, where the configuration information includes a media access control MAC address.

The BMC in this embodiment may be configured to execute the technical solutions in Embodiments 1 to 3. Implementation principles and technical effects thereof are similar, and details are not described herein again.

Figure 7:
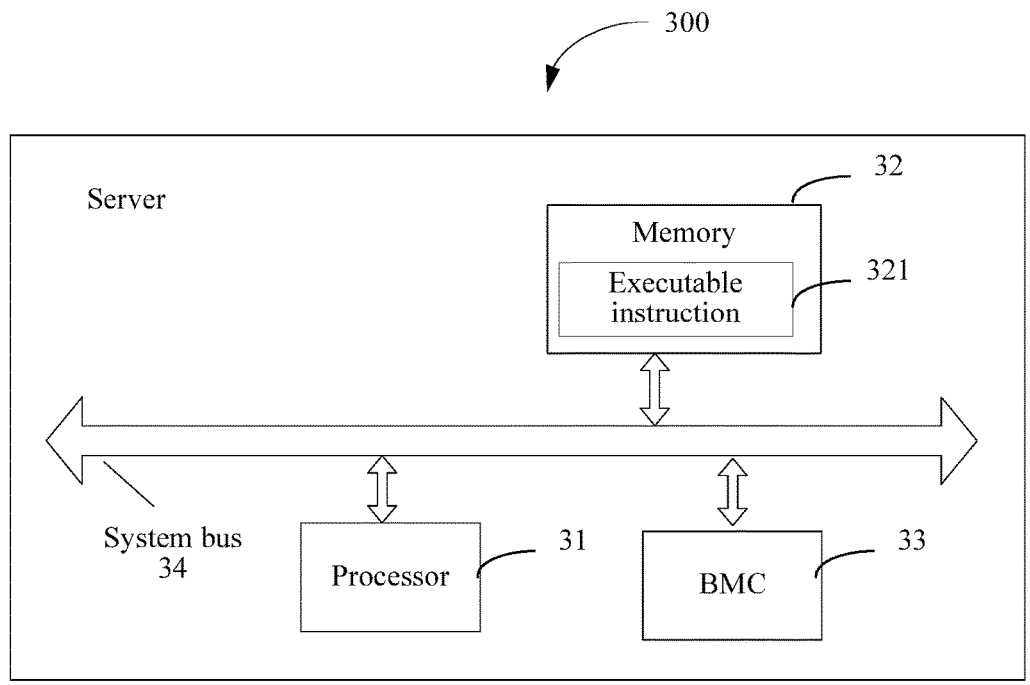
FIG. 7 is a schematic structural diagram of a server according to Embodiment 6 of the present disclosure.

FIG. 7 is a schematic structural diagram of a server according to Embodiment 6 of the present disclosure. As shown in FIG. 7, the server 300 in this embodiment includes a processor 31, a memory 32, a BMC 33, and a system bus 34. The memory 32 and the BMC 33 are connected to and communicate with the processor 31 using the system bus 34. The system bus 34 may be a PCIe bus. The server is connected to the BMC using the PCIe bus to establish a data exchange path between the server and the BMC, and data is transmitted using the data exchange path. The memory 32 stores a computer executable instruction 321. The processor 31 is configured to execute the computer executable instruction 321 to obtain a first packet and send the first packet to the BMC 33. The BMC is further configured to execute the following operations: receiving a first packet, where the first packet includes first management data or service data, and the first packet is transmitted through a first channel, where the first channel is a communications path for transmitting service data to an external network using a physical network adapter of the server 300; and forwarding, according to a forwarding rule, the received first packet to a physical network adapter of the BMC 33 using a preconfigured virtual network adapter, where the first packet is sent to the external network via the physical network adapter.

The BMC 33 is further configured to receive a second packet, where the second packet includes second management data, and the second packet is transmitted through a second channel. The second channel is a communications path for transmitting the second management data to the external network using the physical network adapter of the BMC 33.

The first management data includes a status parameter of an operating system OS of the server, a status parameter of service software of the server, or a status parameter of a hardware component of the server. The service software includes application software embedded into the server and third-party application software, and the hardware component includes a CPU, a memory, a hard disk, a compact disc drive, a network adapter, and a graphics card that are of the server. The second management data includes temperatures, voltages, and currents of a mainboard, the CPU, and a fan that are of the server.

Optionally, the BMC 33 is further configured to forward the first packet or the second packet to a control module of the BMC 33 using the virtual network adapter. The control module is configured to monitor a running status of the server according to the first management data included in the received first packet or the second management data included in the received second packet.

In this embodiment, the forwarding rule includes the packet is forwarded to the control module of the BMC 33 when a destination MAC address of a received packet is a MAC address of the BMC 33; and the packet is forwarded to the physical network adapter and sent to the external network via the physical network adapter when the destination MAC address of the packet is not the MAC address of the BMC 33.

That the virtual network adapter forwards the received first packet or second packet according to the forwarding rule is transmitting the first packet transparently using a bridge of the BMC 33; or adding an inspection point to a driver layer of the physical network adapter, and recognizing and forwarding the first packet or the second packet using the inspection point added to the driver layer of the physical network adapter.

The BMC 33 is further configured to manage configuration information of the virtual network adapter, where the configuration information includes a media access control MAC address.

The server in this embodiment may be configured to execute the technical solutions provided in Embodiments 1 to 3. Specific implementation manners and technical effects thereof are similar, and details are not described herein again.

Figure 8:
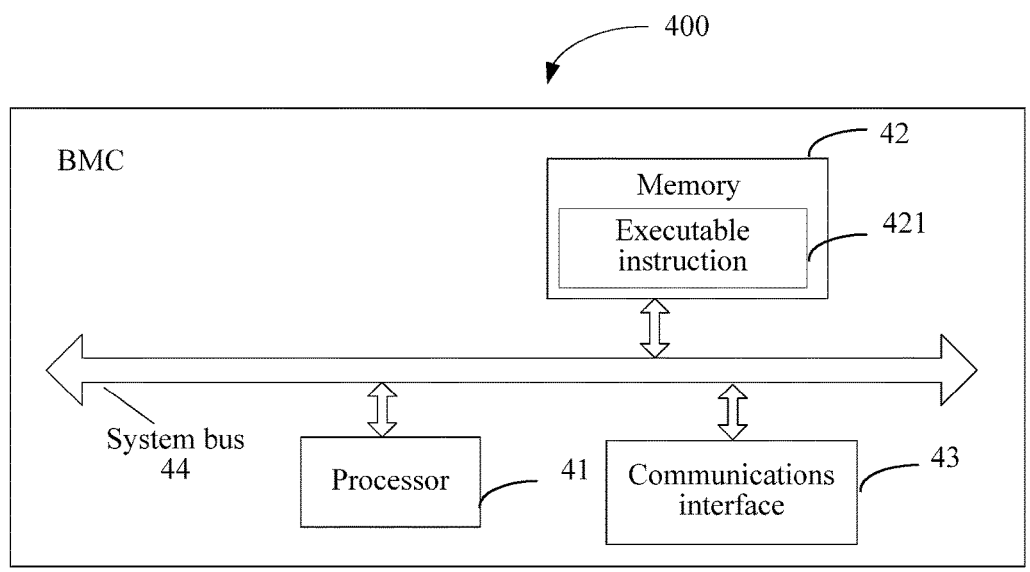
FIG. 8 is a schematic structural diagram of a BMC according to Embodiment 7 of the present disclosure.

FIG. 8 is a schematic structural diagram of a BMC according to Embodiment 7 of the present disclosure. As shown in FIG. 8, the BMC 400 in this embodiment includes a processor 41, a memory 42, a communications interface 43, and a system bus 44. The memory 42 and the communications interface 43 are connected to and communicate with the processor 41 using the system bus 44. The communications interface 43 is configured to communicate with another network device. The memory 42 stores a computer executable instruction 421. The processor 41 is configured to execute the computer executable instruction 421 to enable the BMC 400 to execute the following operations: receiving a first packet, where the first packet includes first management data or service data, and the first packet is transmitted through a first channel, where the first channel is a communications path for transmitting service data to an external network using a physical network adapter of a server; and forwarding, according to a forwarding rule, the received first packet to a physical network adapter of the BMC using a preconfigured virtual network adapter, where the first packet is sent to the external network via the physical network adapter.

Further, the BMC 400 is further configured to receive a second packet, where the second packet includes second management data, and the second packet is transmitted through a second channel, where the second channel is a communications path for transmitting the second management data to the external network using the physical network adapter of the BMC 400.

The first management data includes a status parameter of an operating system OS of the server, a status parameter of service software of the server, or a status parameter of a hardware component of the server. The service software includes application software embedded into the server and third-party application software, and the hardware component includes a CPU, a memory, a hard disk, a compact disc drive, a network adapter, and a graphics card that are of the server. The second management data includes temperatures, voltages, and currents of a mainboard, the CPU, and a fan that are of the server.

Optionally, the BMC 400 is further configured to forward the first packet or the second packet to a control module of the BMC 400 using the virtual network adapter. The control module is configured to monitor a running status of the server according to the first management data included in the received first packet or the second management data included in the received second packet.

The forwarding rule includes the packet is forwarded to the control module of the BMC 400 when a destination MAC address of a received packet is a MAC address of the BMC 400; and the packet is forwarded to the physical network adapter and sent to the external network via the physical network adapter when the destination MAC address of the packet is not the MAC address of the BMC 400.

That the virtual network adapter forwards the received first packet or second packet according to the forwarding rule is transmitting the first packet or the second packet transparently using a bridge of the BMC 400; or adding an inspection point to a driver layer of the physical network adapter, and recognizing and forwarding the first packet or the second packet using the inspection point added to the driver layer of the physical network adapter.

Optionally, the server and the BMC 400 are connected using a PCIe interface to establish a data exchange path between the server and the BMC 400. The data exchange path is used to transmit the first packet and the second packet.

Optionally, the BMC 400 is further configured to manage configuration information of the virtual network adapter, where the configuration information includes a media access control MAC address.

The server in this embodiment may be configured to execute the technical solutions provided in Embodiments 1 to 3. Specific implementation manners and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for unified communication of a server, comprising:
   receiving, by a baseboard management controller (BMC), a first packet, wherein the first packet is an in-band packet which comprises first management data or service data, wherein the first packet is for transmission through a first channel, and wherein the first channel is a communications path for transmitting the service data to an external network using a physical network adapter of the server;
   forwarding, by the BMC according to a forwarding rule, the received first packet to a physical network adapter of the BMC using a preconfigured virtual network adapter, wherein the first packet is sent to the external network via the physical network adapter of the BMC; and
   forwarding the received first packet to a control module of the BMC using the preconfigured virtual network adapter, wherein the control module is configured to monitor a running status of the server according to the first management data comprised in the received first packet, wherein the forwarding rule comprises:
   forwarding a packet to the control module of the BMC when a destination media access control (MAC) address of the received packet is a MAC address of the BMC; and
   forwarding the packet to the physical network adapter of the BMC using a preconfigured virtual network adapter and sending to the external network via the physical network adapter of the BMC when the destination MAC address of the received packet is not the MAC address of the BMC.

2. The method according to claim 1, further comprising receiving, by the BMC, a second packet, wherein the second packet is an out-of-band packet which comprises second management data, wherein the second packet is transmitted through a second channel, and wherein the second channel is a communications path for transmitting the second management data to the external network using the physical network adapter of the BMC.

3. The method according to claim 2, further comprising forwarding, by the BMC, the second packet to the control module of the BMC using the preconfigured virtual network adapter, wherein the control module is configured to monitor a running status of the server according to the second management data comprised in the received second packet.

4. The method according to claim 2, wherein the server and the BMC are connected using a Peripheral Component Interconnect express (PCIe) interface to establish a data exchange path between the server and the BMC, and wherein the data exchange path is used to transmit the first packet and the second packet.

5. The method according to claim 1, further comprising managing, by the BMC, configuration information of the preconfigured virtual network adapter, wherein the configuration information comprises a MAC address.

6. The method according to claim 1, wherein forwarding, by the preconfigured virtual network adapter, the received first packet or second packet comprises transmitting, by the preconfigured virtual network adapter, the first packet or the second packet transparently using a bridge of the BMC.

7. A baseboard management controller (BMC), comprising:
   a transceiver configured to receive a first packet, wherein the first packet is an in-band packet which comprises first management data or service data, wherein the first packet is for transmission through a first channel, and wherein the first channel is a communications path for transmitting the service data to an external network using a physical network adapter of a server; and a virtual network adapter configured to:
forward the first packet received by the transceiver to a physical network adapter of the BMC according to a forwarding rule, wherein the physical network adapter of the BMC is configured to send the first packet to the external network; and forward the received the first packet to a control module of the BMC using the virtual network adapter, wherein the control module is configured to monitor a running status of the server according to the first management data comprised in the received first packet, wherein the forwarding rule comprises:
forward a packet to a control module of the BMC when a destination media access control (MAC) address of the received packet is a MAC address of the BMC; and forward the packet to the physical network adapter of the BMC using a preconfigured virtual network adapter and sending to the external network via the physical network adapter of the BMC when the destination MAC address of the received packet is not the MAC address of the BMC.

8. The BMC according to claim 7, wherein the transceiver is further configured to receive a second packet, wherein the second packet is an out-of-band packet which comprises second management data, wherein the second packet is transmitted through a second channel, and wherein the second channel is a communications path for transmitting the second management data to the external network using the physical network adapter of the BMC.

9. The BMC according to claim 8, wherein the BMC is further configured to monitor a running status of the server according to the second management data comprised in the received second packet.

10. The BMC according to claim 8, wherein the BMC further comprises a bridge, and wherein the virtual network adapter is further configured to:
add an inspection point to a driver layer of the physical network adapter of the BMC; and
recognize and forward the first packet or the second packet using the inspection point added to the driver layer of the physical network adapter of the BMC.

11. The BMC according to claim 8, wherein the server and the BMC are connected using a Peripheral Component Interconnect express (PCIe) interface to establish a data exchange path between the server and the BMC, and wherein the data exchange path is used to transmit the first packet and the second packet.

12. The BMC according to claim 7, wherein the BMC is further configured to manage configuration information of the virtual network adapter, and wherein the configuration information comprises a MAC address.

13. A server, comprising:
a memory configured to store a computer executable instruction;
a baseboard management controller (BMC);
a processor configured to execute the computer executable instruction to send a first packet to the BMC; and
a system bus, wherein the memory and the BMC are connected to and complete mutual communication with the processor using the system bus, wherein the BMC is configured to:
receive the first packet, wherein the first packet is an in-band packet which comprises first management data or service data, wherein the first packet is for transmission through a first channel, and wherein the first channel is a communications path for transmitting the service data to an external network using a physical network adapter of the server;

forward, according to a forwarding rule, the received first packet to a physical network adapter of the BMC using a preconfigured virtual network adapter, wherein the first packet is sent to the external network via the physical network adapter of the BMC; and forward the received first packet to a control module of the BMC using the preconfigured virtual network adapter, wherein the control module is configured to monitor a running status of the server according to the first management data comprised in the received first packet, wherein the forwarding rule comprises:
forward a packet to a control module of the BMC when a destination media access control (MAC) address of the received packet is a MAC address of the BMC; and forward the packet to the physical network adapter of the BMC using a preconfigured virtual network adapter and sending to the external network via the physical network adapter of the BMC when the destination MAC address of the received packet is not the MAC address of the BMC.

14. The server according to claim 13, wherein the processor is further configured to execute the computer executable instruction to send a second packet to the BMC, wherein, the BMC is further configured to receive the second packet, wherein the second packet is an out-of-band packet which comprises second management data, wherein the second packet is transmitted through a second channel, and wherein the second channel is a communications path for transmitting the second management data to the external network using the physical network adapter of the BMC.

15. The server according to claim 14, wherein the BMC is further configured to forward the second packet to a control module of the BMC using the preconfigured virtual network adapter, wherein the control module is configured to monitor a running status of the server according to the second management data comprised in the received second packet.

16. The server according to claim 13, wherein forwarding, by the preconfigured virtual network adapter, the received first packet or second packet comprises:
adding an inspection point to a driver layer of the physical network adapter of the BMC; and
recognizing and forwarding the first packet or the second packet using the inspection point added to the driver layer of the physical network adapter of the BMC.

17. The server according to claim 13, wherein forwarding, by the preconfigured virtual network adapter, the received first packet or second packet comprises transmitting the first packet or the second packet transparently using a bridge of the BMC.

* * * * *

UNITED STATES PATENT AND TRADEMARK OFFICE
CERTIFICATE OF CORRECTION

PATENT NO.         : 10,411,971 B2
APPLICATION NO.    : 15/450213
DATED              : September 10, 2019
INVENTOR(S)        : Lin Peng Page 1 of 1

It is certified that error appears in the above-identified patent and that said Letters Patent is hereby corrected as shown below:

In the Claims

Claim 7, Column 19, Line 10: "the received the first packet" should read "the received first packet"

Signed and Sealed this
Fifth Day of November, 2019

Andrei Iancu
*Director of the United States Patent and Trademark Office*